Figure 1:
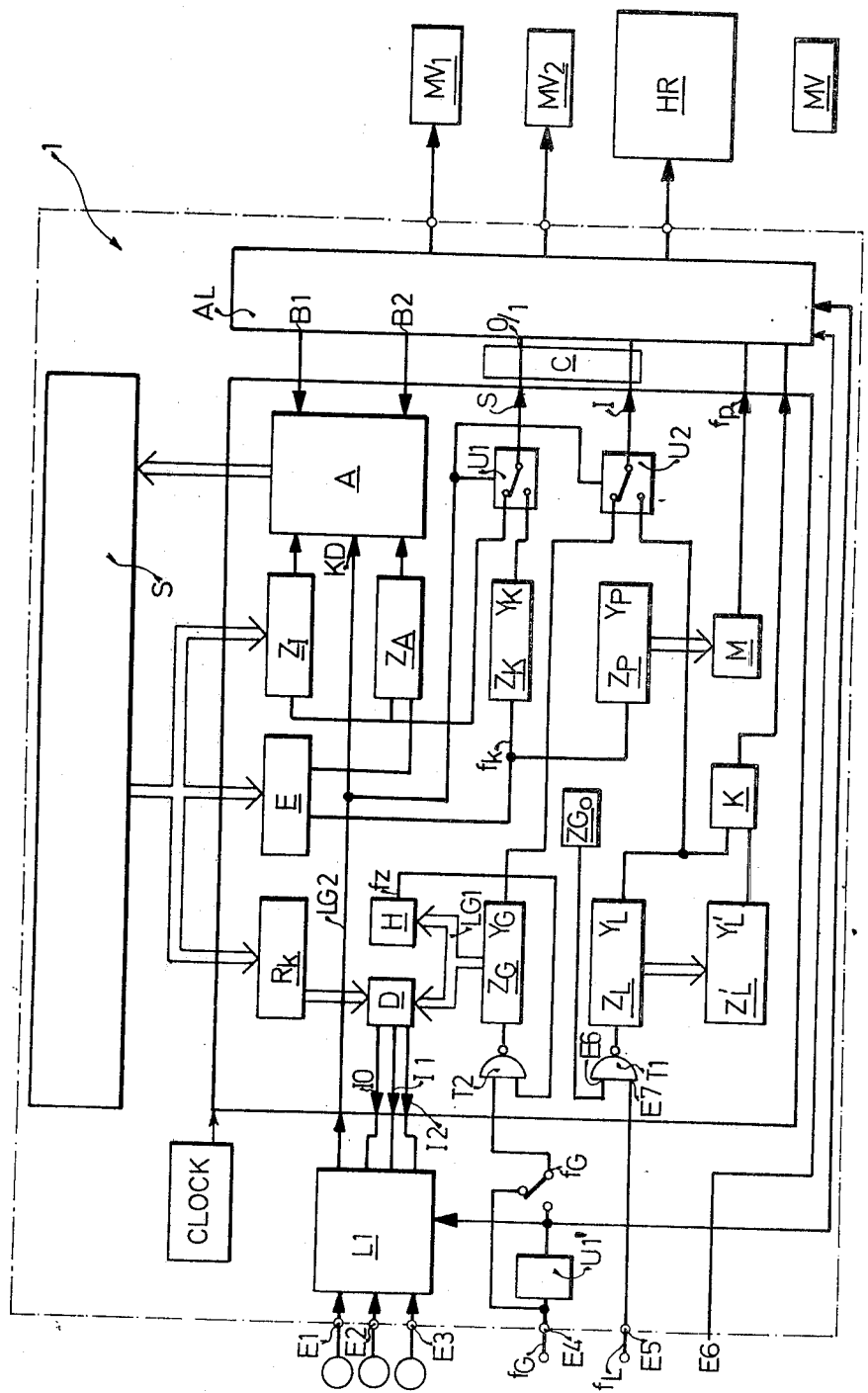

United States Patent [19]

Schneider et al.

[11] 4,269,281
[45] May 26, 1981

[54] AUTOMATIC TRANSMISSION DIGITAL CONTROL SYSTEM

[75] Inventors: Yves Schneider, Paris; George Dubuisson, Poissy, both of France

[73] Assignee: Robert Bosch GmbH, Stuttgart, Fed. Rep. of Germany

[21] Appl. No.: 910,784

[22] Filed: May 30, 1978

[30] Foreign Application Priority Data

Jun. 10, 1977 [DE] Fed. Rep. of Germany ....... 2726115

[51] Int. Cl.$^3$ .............................................. B60K 17/06
[52] U.S. Cl. ................................... 180/70 R; 74/866; 180/336
[58] Field of Search ............. 180/70 R, 170, 175–179, 180/271; 74/866

[56] References Cited

U.S. PATENT DOCUMENTS

| 3,713,355 | 1/1973 | Wakamatsu | 74/866 |
|---|---|---|---|
| 3,727,488 | 4/1973 | Wakamatsu | 74/866 |
| 3,885,472 | 5/1975 | Wakamatsu | 74/866 |
| 4,073,203 | 2/1978 | Wurst | 74/866 |

*Primary Examiner*—John P. Silverstrim

*Attorney, Agent, or Firm*—Frishauf, Holtz, Goodman & Woodward

[57] ABSTRACT

Constants for reconstructing by straight line approximations a plurality of characteristic shift curves each plotting limiting engine load vs. engine speed are stored in a main storage. A speed counter furnishes a binary speed number indicating present engine speed and a load counter furnishes a load number indicative of the actual position of the gas pedal. Output logic furnishes address control signals selecting the constants stored in the main storage for a particular characteristic curve in response to the load and speed numbers and a present gear signal. From these a limiting load number is computed. A comparator compares the present load number to the limiting load number and output logic furnishes a selected gear shift control signal if the comparator output is indicative of the correct relationship between the limiting and actual loads for the desired shift. The main pressure in the automatic transmission is also controlled and desired gear shift signals from a driver operated gear selector are blocked if the engine speed exceeds corresponding permissible upper speed limits.

16 Claims, 6 Drawing Figures

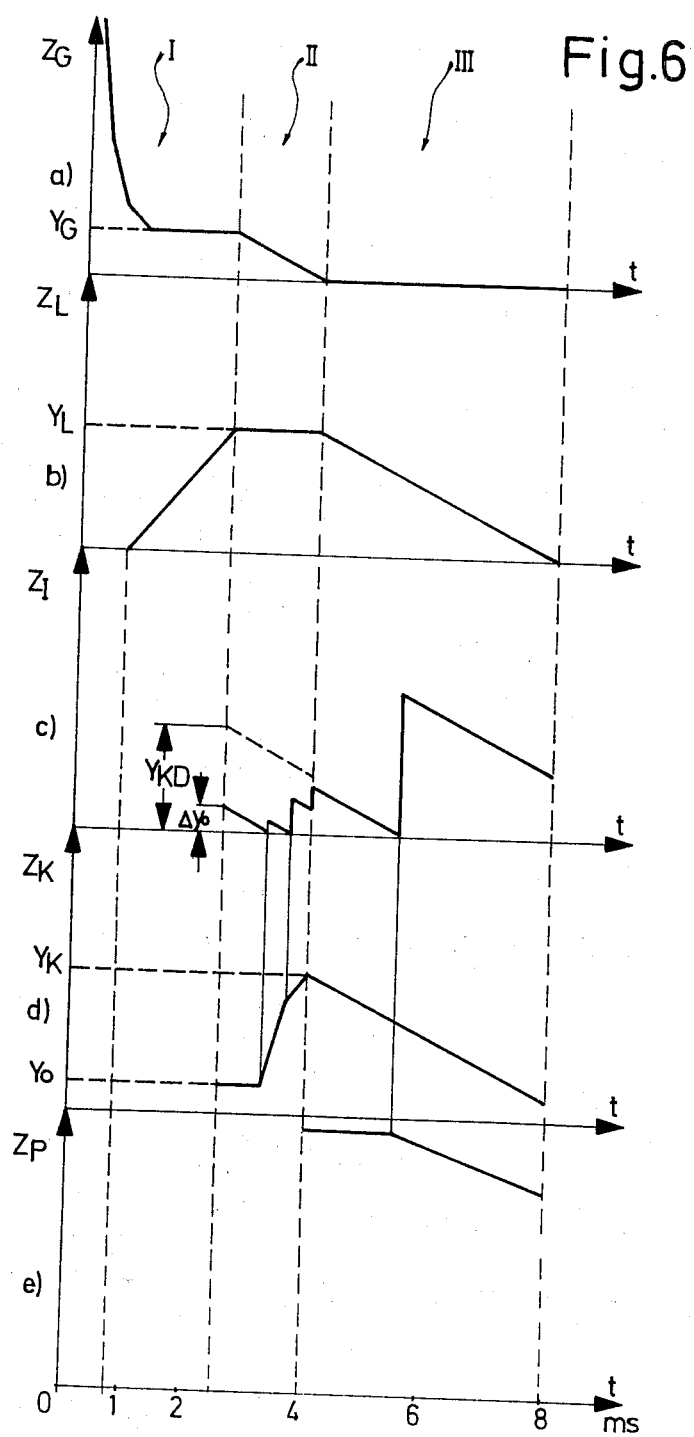

AUTOMATIC TRANSMISSION DIGITAL CONTROL SYSTEM

Cross reference to related applications, assigned to the assignee of this application:
U.S. Ser. No. 621,513, filed Oct. 10, 1975, Bert Wurst et al;
U.S. Ser. No. 882,138, filed Feb. 28, 1978, Sauer et al.
These are hereby incorporated by reference into the present application.

The present invention relates to automatic transmission systems and in particular to automatic transmission systems having a digital control.

BACKGROUND AND PRIOR ART

Automatic transmission systems are known in which data regarding the actual speed and load of the engine is continually supplied and in which a gear shift is initiated when the actual load and speed signals are outside of the range assigned to the then-present gear. Further, driver operated gear shifts can be carried out if the speed and load are such that these conditions can be accommodated in the new gear. In particular, the speeds must be below the limiting speed of the gear and the engine must be able to develop sufficient torque. Specifically, the automatic transmissions are generally so designed that the engine will be able to furnish a maximum torque for the then-present speed. It is a disadvantage of known automatic transmission systems that the various measurements and computations cannot be carried out with sufficient sensitivity and that the systems are relatively complicated. Further in systems which operate on a mechanical-hydraulic basis the wear of the various parts will result in changes in the characteristic curves and thus in changes in the operating points at which the gear shift can take place. Repair and maintenance may be very complicated and expensive.

THE INVENTION

It is an object of the present invention to furnish an automatic transmission control system of high precision with nonetheless requires very little space. The system of the present invention is to utilize a large amount of stored data and data derived from the actual operating conditions of the engine and to process this data very accurately so that the operation of the system corresponds very accurately to the then-present operating conditions.

It is a further object of the present invention to furnish a digital control system which is embodied in a special purpose computer and which may later readily be combined with special purpose computers regulating other operations such as fuel injection, ignition, etc.

The present invention comprises a main storage which stores a plurality of sets of constants each set for reconstructing a characteristic upshift or downshift curve of limiting engiine load vs. engine speed by straight line approximations. Inputs signals to this system include a present speed signal and a present load signal having frequencies corresponding, respectively, to actual engine speed and the actual gas pedal position. A speed counter receives the present speed signal and furnishes a corresponding binary speed number, while a present load counter furnishes a present load number corresponding to the frequency of the present load signal. A signal indicative of the actually engaged gear is also furnished and, in combination with the binary speed number controls addressing means which address the main storage at storage locations storing the constants for the applicable shift curve. Computing means including a limiting load counter compute a limiting load number under control of the constants read out from the main storage. A comparator then compares the present load number to the limiting load number and furnishes a comparator output signal if the limiting load number has a predetermined relationship to the present load number. Finally, output logic means furnish a gear control signal initiating an upshift or a downshift under control of the present gear signal and the comparator output signal.

DRAWINGS ILLUSTRATING A PREFERRED EMBODIMENT

Figure 2:
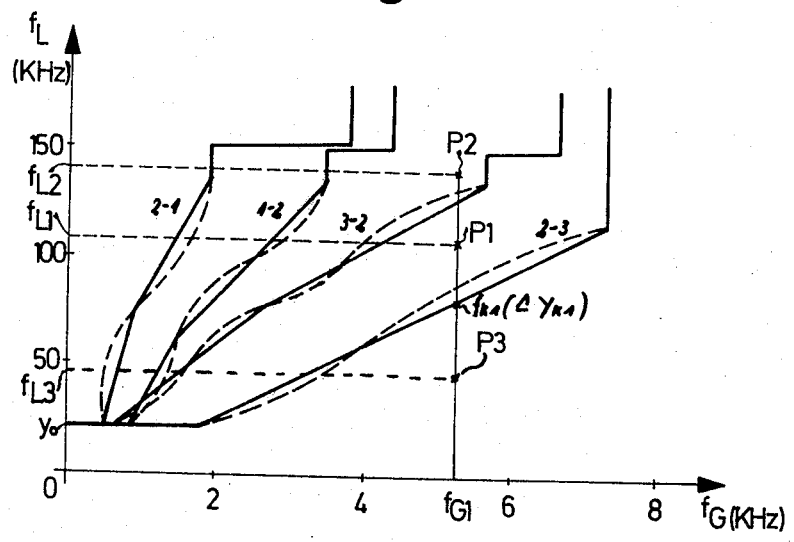
Figure 3:
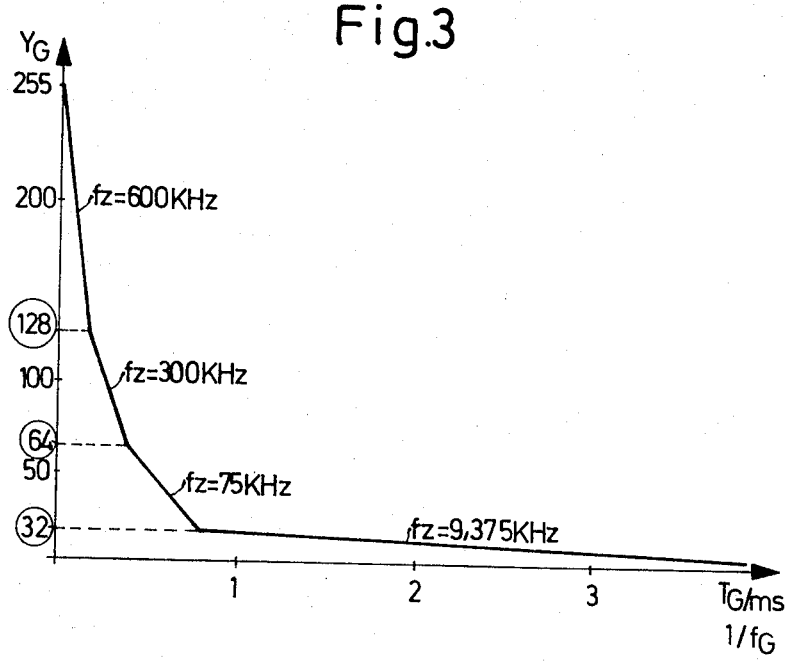
Figure 4:
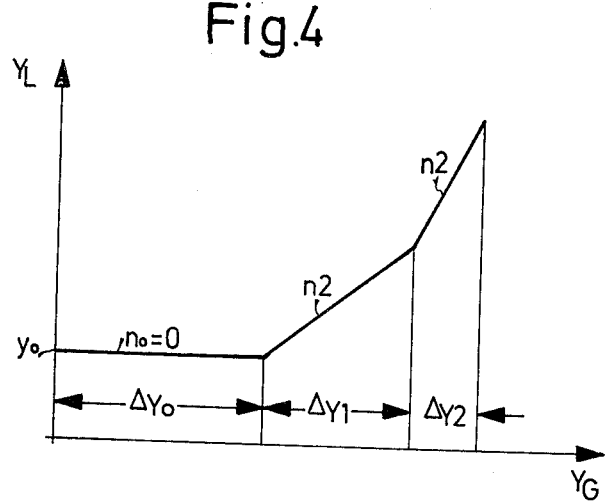
Figure 5:
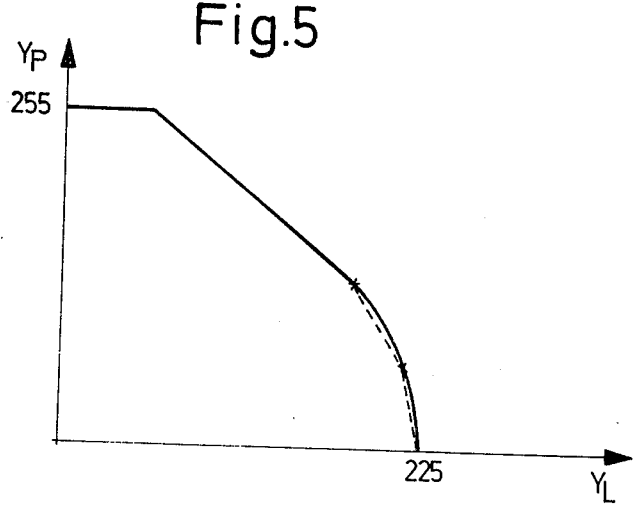

FIG. 1 is a block diagram of the system of the present invention;
FIG. 2 shows a family of characteristic shift curves for a three gear transmission, with load frequency plotted as a function of speed frequency;
FIG. 3 is a curve of speed number as a function of the period of the present speed signal;
FIG. 4 illustrates linear approximation of a characteristic shift curve;
FIG. 5 is a curve showing desired values of main pressure as a function of engine load;
and FIG. 6 shows the count on the counters of FIG. 1 as a function of time during one operating cycle of the system.

The following description will relate to a preferred embodiment having three forward gears and a reverse gear. Although all the figures and diagrams correspond to this three gear system, the invention is of course not to be limited to such. The preferred embodiment also constitutes a special purpose digital computer which can be incorporated into an over-all control system for the motor vehicle. Input data can be supplied to such a system in digital form. When the actual sensors do not furnish a digital output analog-digital convertors or mechanical-digital convertors can be supplied. The special purpose computer to be described below can readily be embodied in an integrated circuit and can be combined with other special purpose computers, thereby allowing the sharing of particular elements such as storages. Where a shared storage is used, a time multiplexing system can be used for addressing such storages.

The special purpose computer is denoted by reference numeral 1 in FIG. 1. It has six input terminals E1, E2, E3, E4, E5 and E6. The signals at terminal $E_1$ are desired gear selector signals which correspond to the gear selected by the driver. Input terminal $E_2$ receives the kickdown signal KD, that is the signal which is driver initiated for obtaining a downshift to increase acceleration. Terminal $E_3$ receives a no load signal, that is a signal which signifies that the throttle valve is fully closed and that the motor vehicle is coasting. The signal applied to terminal $E_4$ is a present speed signal, $f_G$, whose frequency is proportional to engine speed. The signal applied at terminal $E_5$ is a present load signal which has a frequency corresponding to the actual engine load, i.e. the throttle position or the gas pedal position, while the signal applied at terminal $E_6$ is a present gear signal, i.e. a signal indicating which gear is engaged. The present speed signal $f_G$ can be derived directly from the sequence of ignition pulses and may be reduced by a factor of 2 by a frequency divider stage U1'. The frequency of signal $f_G$ varies between 110 Hz and 3.5 kHz, while the present load signal has frequencies varying between 25 kHz and 150 kHz. Present load signal $f_L$ can be generated by a suitable transducer stage wherein the position of the throttle valve or of the gas pedal serves as an input and which furnishes the signal $f_L$ (that is signal having a frequency corresponding to the mechanical position of the input element) at its output. Electronic building blocks for producing a signal having a frequency corresponding to a mechanical displacement are well known. Basically, they include an oscillator whose oscillating frequency is varied as a function of the variation of the value of one component e.g. a resistor. The variation of the resistor is a function of the position of the mechanical element relative to a reference position.

Input terminals $E_1$, $E_2$ and $E_3$ are connected to an input logic circuit L1. It is the function of logic circuit L1 to prevent the driver initiated shift or to prevent a kickdown during predetermined operating conditions of the engine as will be discussed below.

Frequencies $f_G$ and $f_L$ are converted to a binary speed number $Y_g$ and a binary present load number $Y_L$ respectively in counters $Z_g$ and $Z_L$. Further, a limiting load number $Y_k$ is computed from values read out from a main storage S. The values are read out under control of the present engine speed number $Y_g$. Depending upon the relationship between the limiting load number $Y_k$ and the present load number $Y_L$ as indicated by the output signal of comparator C output logic $A_L$ either furnishes or does not furnish a gear shift control signal initiating an upshift or a downshift operation. It should be noted that a clock generator having an output frequency $f_0 = 600$ kHz is part of special purpose computer 1.

The mode of operation of the present system will first be explained relative to the curves of FIG. 2. In FIG. 2, frequency $f_L$ is plotted as a function of frequency $f_G$, that is, present load is plotted as a function of present engine speed. Designation 1-2 for one of the characteristic curves means, for example, that whenever the actual operating point of the engine lies below this curve, an upshift from the first to the second gear should occur. Similarly a downshift from the third to the second gear should take place when the operating point of the engine lies above characteristic curve 3-2. Unnecessary shifting back and forth between two gears is eliminated by the relatively broad switching hysteresis. The solid lines in FIG. 2 indicate desired characteristic curves of limiting load vs. engine speed, while the dashed lines indicate the curves actually obtained in a preferred embodiment as will be discussed below.

To clarify the operation, let is be assumed that the engine is operating at operating point P1, that is at a speed $f_{G1}$ and a load $f_{L1}$. The limiting load for an upshift operation from second to third gear would then be characterized by frequency $f_{K1}$ (i.e. corresponding to limiting load number $Y_{k1}$). If the presently engaged gear is third gear, the control system will not initiate any gear shift. However, if the frequency $f_L$ increases to operating point P2, that is reaches the value $f_{L2}$, then the downshift curve 3-2 has been crossed and the control circuit will initiate a downshift from third to second gear. If, on the contrary, the engine was in second gear when the operating conditions were as specified by operating point P1, then no gear shift would be initiated unless the load dropped to operating point P3, that is to a frequency $f_{L3}$. Under these conditions the load is less than the limiting load for upshift and an upshift from second to third gear would be initiated. It should be noted that the absolutely vertical movement from point P1 to point P2 and P3 would not occur in practice since in general some speed change will occur together with the change in load. The perpendicular line segments above a frequency of $F_1 = 150$ kHz are the kickdown speed thresholds.

Referring again to FIG. 1, the present load number $Y_L$ is created in an eight bit counter $Z_L$. Counter $Z_L$ has a counting input and receives pulses of frequency $f_L$ during a predetermined gating time $T_1$. Gating time $T_1$ can be determined by the requirement that counter $Z_L$ will have counted to capacity at the end of the gating time when the highest possible counting frequency $f_0 = 150$ kHz is applied at its input. Therefore $T_1 = 255/150$ kHz $= 1.7$ ms. The gating signal is furnished by stage $ZG_0$ which is triggered at the start of phase I of each cycle of operation of this system (see FIG. 6) and maintained its output for 1.7 ms. Stage $ZG_0$ may, for example, be a monostable multivibrator. The gating signal is applied to one input of a NAND gate $T_1$ whose other input is connected to terminal $E_5$. The count on counter $Z_L$ at the end of the gating time is then a measure of the present engine load.

The creation of the binary speed number $Y_g$ as a function of the present speed signal having frequency $f_G$ is somewhat more difficult. Frequency $f_G$ is so low that direct counting as described above can not be carried out. Therefore the number of pulses of a frequency $f_z$ are counted which are applied to the counting input of counter $Z_G$ during a half period of the square wave having a frequency $f_G$. In other words, the gating signal is derived from two sequential passages through zero of signal $f_G$. During this time a NAND gate $T_2$ allows counting pulses of frequency $f_Z$ to be applied to the counting input of counter $Z_G$. If frequency $f_Z$ were a constant frequency, the number generated in counter $Z_G$ would be proportional to the period $T_G = 1/f_G$ of the present speed signal. To create the inverse of this number, counter $Z_G$ is first set to a maximum count which, in the preferred embodiment, is the binary number 255. It then counts down with the frequency $f_Z$ which is variable as a function of time or as a function of the then-present count $Y_G$ on counter $Z_G$. Frequency $f_Z$ is varied in such a manner that the substantially hyperbolic curve of FIG. 3 results. The hyperbolic curve is approximated by four straight line segments. This approximation achieves sufficient accuracy with relatively little difficulty. This lack of difficulty results from the fact that the frequency associated with each straight line segment is an integral subdivision of clock frequency $f_0 = 600$ kHz, and that the break points of the curve occur at integral submultiples of the count on counter $Z_G$. The curve of FIG. 3 is plotted in accordance with the following table, the values of which are also entered on the curve in FIG. 3:

| $Y_G$ | $f_Z$/kHz |
|---|---|
| 225 to 128 | 600 |
| 127 to 64 | 300 |
| 63 to 32 | 75 |
| 31 to 0 | 9.375 |

The characteristic curve of FIG. 3 is a plot of the number $Y_G$ on counter $Z_G$ as a function of the period of the present speed signal $f_G$. The characteristic curves resulting from this approximation are shown by dashed lines in FIG. 2. The deviation from the desired value is within the required accuracy.

Referring now to FIG. 1, the variable frequency $f_Z$ is generated in block H. Block H contains a plurality of frequency dividers connected in cascade, the first dividing the applied frequency by 2, the second dividing its applied input frequency by 4, and the third dividing by 8. Three AND gates are provided, each having a first input connected to the output of one of the frequency divider stages. A fourth AND gate has a first input directly connected to receive the clock frequency of 600 kHZ. Each of the AND gates has a second input connected to receive a gating signal. The gating signals are derived from the counting outputs of counter $Z_G$. The fourth AND gate would receive a gating signal while the count on counter $Z_G$ varies between 255 and 128, the gating signal associated with the first voltage divider would be present while the count on counter $Y_G$ varies between 128 and 64, etc. The AND gate outputs are all connected to the inputs of an OR gate whose output is symbolized by the line connecting block H to the input of AND gate $T_2$. The pulses $f_Z$ are applied to the counting input of counter $Z_G$ in the presence of a signal at the second input of AND gate $T_2$, that is during a half period of signal $f_G$.

Blocks $Z_i$, $Z_a$, $Z_k$, $Z_p$ are eight bit counters. $Z_i$ is an interval decoder, $Z_a$ is an address counter, $Z_k$ generates the limiting load number $Y_k$ and counter $Z_p$ generates the reference value for the main pressure.

Main pressure regulation takes place by regulating the current through a solenoid valve MV. This is the number $Y_p$ on counter $Z_p$. The main pressure reference value is to vary as a function of engine load. Specifically, the non-linear characteristic line of FIG. 5 is to be implemented. The process of creating number $Y_p$ in counter $Z_p$ in dependence on the load number $Y_L$ will be described in greater detail below.

The first phase of the cycle of FIG. 6 is a so-called measuring phase I in which the frequency $f_G$ and $f_L$ are converted into binary numbers $Y_G$ and $Y_L$ respectively. The next phase phase II, is a computing phase in which the limiting load number $Y_K$ is formed. One of the characteristic shift curves is shown schematically in FIG. 4 (without kickdown threshold). $Y_L$ is plotted along the ordinate, $Y_G$ along the abscissa. The characteristic shift curve is approximated by three straight line segments and any point on this line can be computed as a function $Y_G$ by use of six parameters. The parameters are $\Delta Y_i$, $n_i$ where $i=0,1,2$. The initial value $Y_0$ is constant. The curve thus consist of intervals (speed ranges) $\Delta Y_0$, $\Delta Y_1$, $\Delta Y_2$ each with an associated slope $n_0$, $n_1$, and $n_2$. In order to create the count of $Y_K$, a sequence of pulses having a variable repetition rate is applied to the input of counter $Z_K$ during a time proportional to the binary speed number $Y_G$. The total duration of counting in counter $Z_K$ is determined by counting down the number $Y_G$ in counter $Z_G$ (or in a counter receiving the number $Y_G$) at a predetermined frequency, for example $f_4=37.5$ kHZ. The counting process is started simultaneously with the countdown of number $Y_G$ and terminates when the counted down number is zero. The variable frequency $f_K$ is generated in block E. The frequency in each interval $\Delta Y_i$ is proportional to slope $n_i$. Counter $Z_I$ is used as an interval decoder. At the beginning of phase II a starting value of $\Delta Y_i$ is loaded into counter $Z_I$. This number is counted down with the same frequency as the count down of counter $Z_G$. When counter $Z_I$ reaches its zero count, a new interval value $\Delta Y_{i+1}$ is read out of storage S. Simultaneously, the frequency of the output of frequency generator E is changed to the value associated with the next interval. Counter $Z_K$ thus counts upward in each interval with a corresponding frequency as shown in FIG. 6d. When $Y_G=0$, that is at the end of the count-down of the binary speed number, the number in counter $Z_K$ will be the limiting load number $Y_K$.

The number $Y_K$ must then be compared to the number $Y_L$, that is to the present load number, in order to decide whether or not a shift operation may be initiated. A comparison between these two numbers is accomplished as follows. When $Y_G$ has been counted down to zero, a simultaneous count-down of counters $Z_L$ and $Z_K$ is initiated. Both are counted down at the same frequency $f_4$ during the third phase of the cycle shown in FIG. 6. As soon as counter $Z_L$ has reached the count of zero, a test is carried out as to whether counter $Z_K$ has or has not reached zero also. If counter $Z_K$ has already reached zero, the present load exceeds the limiting load and a "1" signal is created at the 0/1 input of output logic AL. If the present load is less than the limiting load, a "0" signal is created at this terminal.

It should be noted at this point that the system in addition to the components shown in FIG. 1 has further components as discussed throughout the text for achieving null detection, causing the proper loading of the counters, etc. These are omitted for the purpose of clarity. For example it is clear that one skilled in the art would know that the zero count on counter can be recognized by connecting an OR gate to all counter outputs. The OR gate will furnish a "1" output as long as any count exists on the counter but a "0" output when the zero state has been reached. This output signal can then control the reading out of the next subsequent values from main storage S. Similarly the change from a "1" to a "0" at the output of the OR gate can be utilized to test whether or not another counter has also reached a zero output count.

During phase III of FIG. 6 the reference main pressure number $Y_p$ is created in counter $Z_p$ as a function of the present load number $Y_L$. Again, the non-linear curve of FIG. 5 is approximated by straight line segments as was done for the characteristic shift curve in FIG. 4. The generation of count $Y_p$ is thus completely similar to that of the generation of the limiting load number $Y_K$. Counter $Z_I$ is again utilized as an interval decoder. The relevant constants, that is slopes and interval values are stored in corresponding storage locations in main storage S and are read-out under control of address logic A and interval counter $Z_I$ as described with reference to the curve approximation of FIG. 4. The number $Y_p$ created in the counter is converted into a corresponding frequency $f_p$. Specifically the number $Y_p/2^8$ is multiplied by clock frequency $f_0$. The multiplier is a so-called rate multiplier and the main pressure reference frequencies $f_p$ can be used directly to control the standard main pressure regulator HR for solenoid valve MV.

The operation in response to a kickdown signal KD will now be discussed. The kickdown signal passes through input logic L1 whose other functions will be described below and is applied through line LG2 to address logic A. In response to the kickdown signal the gear shift is carried out only as a function of speed, that is only under control of binary speed number $Y_G$ on counter $Z_G$. Different speed threshold values are stored in storage S. Kickdown signal KD also controls two switches U1 and U2 to disconnect counters $Z_K$ and $Z_L$, respectively, from the comparator logic CL after receipt of the kickdown signal, since neither the present load number $Y_L$ nor the limiting load number $Y_K$ are then to be taken into consideration in determining whether a shift will be allowed. As shown in FIG. 6c the kickdown signal causes counter $Z_I$ to be preset to a starting value $Y_{KD}$. If a kickdown signal is present, switches U1 and U2 respectively connect counters $Z_I$ and $Z_G$ to comparator logic CL, so that $Y_{KD}$ is compared to counter $Y_G$. The comparison is carried out as was the comparison between the counts on counters $Z_K$ and $Z_L$ by counting down both counters with a predetermined frequency, for example frequency $f_4$. When the count on counter $Z_G$ reaches zero, a test is carried out whether counter $Z_I$ has reached a zero count or not. If the actual speed number exceeds the limiting number $Y_{KD}$, a "1" signal is set at terminal 0/1 of output logic AL and, if the opposite is true, a "0" signal is set at this terminal. The action of output logic AL in response to the signal will be discussed in greater detail below. It should also be noted that in response to the kickdown signal the third phase of the cycle is omitted because the main pressure is to be set at the highest possible value and not in accordance with the non-linear characteristic curve of FIG. 5.

At the end of phase I of each cycle a counter ZL' is set to the number YL. At the end of phase I of each cycle two load numbers are thus available, one from the previous cycle and the present load number. A comparator K can thus furnish a load change signal which signifies the direction of change of load or, more specifically, furnishes a "1" signal under decreasing load conditions. If the gas pedal is let up, such a load decrease will be noted. If the present load number $Y_L$ was less than the limiting load number $Y_K$, and the characteristic curve, was an upshift curve the furnishing of the "1" load change signal causes the initiation of a delay time in output logic AL. This delay time may for example be 500 ms. Following this time the position of the throttle valve is checked. If the throttle valve is closed, that is if a "1" signal exists at terminal E3 of input logic L1 then an upshift is blocked even though all other conditions for an upshift have been met. This is done in order that the maximum effectiveness can be derived from motor braking. In the absence of a signal at terminal E3 the computation is carried out as described above. A delay time can be created by any one of a number of known means. For example a counter can be counted down from a preset count until it reaches zero.

The gear shift control signals as well as the signals for regulating the regulator stage HR for main pressure valve MV are furnished by output logic AL. First, output logic AL furnishes address control signals B1 and B2 which, for the thenpresent gear, signify the particular shift characteristic curve whose constants are to be read out from storage S. Specifically the generation of signals B1 and B2 can be in accordance with the following truth table:

| MV1 | MV2 | B₁ | B₂ | Shift Curve |
|---|---|---|---|---|
| 0 | 0 | 0 | 0 | 3→2 |
| 0 | 1 | 0 | 1 | 2→1 |
| 1 | 0 | 1 | 0 | 1→2 |
| 0 | 1 | 1 | 1 | 2→3 |

In accordance with a signal representing the present engaged gear (terminal E6), which is derived from the switching state of solenoid valves MV1 and MV2, signals B1 and B2 are generated. As in second gear upshift and downshift is possible, signal B2 is held constant in second gear and signal B1 is varied with each operating cycle of the logic. The gear control signal is furnished in accordance with signals B1 and B2 and the state of the signal at terminal 0/1. This is done in accordance with the following table:

| MV1 | MV2 | Present Gear | B₁ | B₂ | 0/1 | Logic Output |
|---|---|---|---|---|---|---|
| 0 | 0 | 3 | 0 | 0 | 0 | No change |
|   |   |   | 0 | 0 | 1 | Shift down |
| 0 | 1 | 2 | 0 | 1 | 0 | No change |
|   |   |   | 0 | 1 | 1 | Shift down |
| 1 | 0 | 1 | 1 | 0 | 0 | Shift up |
|   |   |   | 1 | 0 | 1 | No change |
| 0 | 1 | 2 | 1 | 1 | 0 | Shift up |
|   |   |   | 1 | 1 | 1 | No change |

The actual gear change is carried out by corresponding activation of solenoid valves MV1 and MV2. A two bit up/down counter is provided within output logic AL. This counter counts up for a upshift operation and down for a downshift operation. The actual switching of solenoid valves MV1 and MV2 takes place only after a predetermined delay time T1. The delay is furnished by a timer in output logic AL and may for example be 200 ms. During this time the main pressure is set. Afterwards the main pressure is regulated as a function of load in accordance with the characteristic curve of FIG. 5 during a further delay T2, which may for example be 800 ms, before it is allowed to return to the maximum permissible value for the new gear.

The operation of input logic L1 and circuits associated therewith will now be discussed briefly. Stored in main storage S are the following values which are transferred to a set of registers $R_k$ at the beginning of each operating cycle.

$S_0 = 320$ Hz $S_1 = 3.68$ kHZ $S_2 = 6.08$ kHZ $S_R$ = Maximum allowable motor speed $S_R = 6500$ min$^{-1}$ $Y_0$ = Initial value of shift curves (FIG. 2), $Y_0 = 23$ kHZ $T_{500}$ = Delay time for upshift "Kick-Up"; adjustable; order of magnitude 500 ms $T_1$ = Delay time for setting the maximum main pressure (200 ms)

$T_2$ = Delay time for regulating the main pressure (800 ms)

The values $S_0$, $S_1$ and $S_2$ are three threshold values for the speed $Y_G$. The value $S_0$ is the threshold speed for reverse gear (6 km/h), while threshold values $S_1$ and $S_2$ represent the limiting speeds for switching back into the first and second gear respectively. The values $S_0$, $S_1$, and $S_2$ are compared to the speed number $Y_G$. If the number $Y_G$ exceeds speeds $S_0$, $S_1$, and $S_2$ respectively a "1" signal on lines $I_0$, $I_1$, $I_2$ applied to logic circuit L1 causes possible desired gear shift signals generated under operator control at terminal $E_1$ to be blocked.

Additional safety features are provided. A main value $S_R$ signifying the maximum permissible engine speed is also stored in storage S. One example of determining whether this speed has been exceeded is use of a counter ZR in output logic AL. This counter is set to a starting value of SR. It is then counted down for a particular angular increment of shaft rotation, as for example the 60° segment of the distributor. If the counter does not reach the value of zero during this angular segment then the motor speed is excessively high and the current supply for the solenoid valves is interrupted.

Various changes and modifications may be made within the scope of the inventive concept.

We claim:

1. In a motor vehicle having an engine, means for furnishing a present speed signal indicative of the then-present engine speed, means for furnishing a present load signal indicative of the then-present engine load, means for furnishing a present gear signal indicative of the presently engaged gear, and automatic transmission means having a plurality of selectable gears, the improvement comprising a digital control system for controlling said transmission means in accordance with characteristic curves of engine load vs. engine speed, said control system comprising main storage means (St) having a plurality of sets of storage locations each for storing a set of constants for approximating one of said characteristic curves;

present load number furnishing means ($Z_L$, T1) connected to said present load signal furnishing means for receiving said present load signal and furnishing a binary present load number corresponding thereto;

addressing means (A) connected to said main storage means for addressing a selected one of said sets of storage locations in response to address control signals (B1, B2) applied thereto, whereby said main storage means furnishes a read-out set of constants read out from the so-selected one of said sets of storage locations;

computing means (E, $Z_K$) connected to said main storage means for computing a limiting load number ($Y_K$) under control of said read-out set of constants;

comparator means (C) connected to said present load number furnishing means and said computing means for furnishing a first or second comparator output signal when said limiting load number is greater or less than said present load number, respectively;

and output logic means (AL) connected to said present gear signal furnishing means, said comparator means, and said addressing means for furnishing said address control signals in response to said present gear signal, and for furnishing an upshift or downshift gearshift control signal in response to a predetermined one of said present gear signals only in the presence of said first or second comparator output signal, respectively.

2. A system as set forth in claim 1, wherein said digital control system operates in a sequence of cycles;

further comprising load number storage means ($Z_L'$) connected to said present load number furnishing means for storing said present load number, thereby furnishing a previous load number in the next following one of said cycles, and load number comparing means (K) connected to said load number storage means and said present load number furnishing means for comparing said present load number to said previous load number and furnishing a load change signal indicative of the direction of load change;

and wherein said output logic means further furnishes said selected one of said gear shift control signals at least in part in dependence upon said load change signal.

3. A system as set forth in claim 1, wherein said present load signal is a signal having a frequency ($f_L$) corresponding to engine load;

and wherein said present load number furnishing means comprises a load counter having a counting input, load logic circuit means having a first input for receiving a gating signal, a second input for receiving said present load signal and an output connected to said counting input of said load counter for applying said present load signal to said counting input only in the presence of said gating signal, and gating signal furnishing means ($ZG_O$) connected to said first input of said load logic circuit means for furnishing a gating signal at the start of each of said cycles, said gating signals having a predetermined time duration.

4. Apparatus as set forth in claim 1, wherein said present speed signal is a signal having a frequency corresponding to the speed of said engine and a period inversely proportional thereto;

further comprising binary speed number furnishing means ($Z_G$, H, T2) connected to said present speed signal furnishing means for receiving said present speed signal and furnishing a binary speed number corresponding thereto, and comprising a speed counter having a counting input and a plurality of counting outputs, speed logic circuit means having a gating input connected to said present speed signal furnishing means, a data input and an output connected to said counting input of said speed counter for transmitting data pulses applied at said data input to said counting input of said speed counter only during a gating time corresponding to said period of said present speed signal, and data pulse furnishing means (H) having control inputs connected to said counting outputs of said speed counter and a data pulse output connected to said data input of said speed logic circuit means for furnishing a sequence of data pulses having frequencies varying as a function of counting signals at said counting outputs to said data input, whereby the count on said counting output at the end of said gating time constitutes said binary speed number.

5. A system as set forth in claim 4, further comprising means for setting said speed counter to a predetermined maximum number at the start of each of said cycles;

and wherein said speed counter counts down in response to said data pulses applied at said counting input.

6. A system as set forth in claim 5, wherein said digital control system further comprises clock signal furnishing means for furnishing a clock signal having a predetermined clock frequency;

and wherein said data pulse furnishing means comprises a plurality of frequency divider means, each for dividing said clock frequency by a predetermined integral number, and means for activating a corresponding one of said frequency divider means in response to predetermined ones of said counting signals at said counting outputs of said speed counter.

7. A system as set forth in claim 1, further comprising binary speed number furnishing means ($Z_G$, H, T2)

connected to said present speed signal furnishing means for receiving said present speed signal and furnishing a binary speed number corresponding thereto; and wherein said computing means comprises a limiting load counter (ZK) having a counting input and a counting output for furnishing said limiting load number, and limiting load counting pulse furnishing means (E) connected to said counting input of said limiting load counter for furnishing a sequence of limiting load pulses having a frequency corresponding to selected ones of said stored constants of said selected set of constants during a counting time interval corresponding to said binary speed number.

8. A system as set forth in claim 7, wherein each of said characteristic curves is approximated by straight line segments each extending over a speed range from a segment starting speed to a segment end speed, each having a predetermined slope;

wherein said set of constants stored in said main storage means comprises speed range numbers signifying said speed ranges and slope numbers signifying said slopes;

further comprising means ($Z_I$) for furnishing a sequence of gating signals each extending over a segmental time interval corresponding to the difference between said segment end speed and said segment starting speed of a corresponding one of said line segments, and counting pulse furnishing means (E) connected to said main storage means and said gating signal furnishing means for furnishing in the presence of each of said gating signals a sequence of counting pulses having a pulse repetition rate corresponding to the slope of said corresponding one of said line segments, whereby the count on said limiting load counter at the end of said counting time interval constitutes said limiting load number.

9. A system as set forth in claim 8, wherein said means for furnishing a sequence of gating signals comprises a gating counter having a plurality of preset inputs connected to said main storage means, a counting output connected to said addressing means and a counting input connected to said clock signal furnishing means for presetting to said speed range number, counting down from said speed range number and furnishing a next address signal to said address means when the count on said counter is zero;

and wherein said addressing means comprises means for addressing said main storage means to read out the next subsequent one of said speed range numbers upon receipt of said next address signal.

10. A system as set forth in claim 9, wherein said means for addressing said main storage means to read out the next subsequent one of said speed range numbers comprises an address counter having a counting input for receiving said next address signal.

11. A system as set forth in claim 7, wherein said present load number furnishing means comprises a present load counter, the count on said counter constituting said present load number;

wherein said present load counter and said limiting load counter are up/down counters;

wherein said limiting load counting pulse furnishing means furnishes a sequence of countdown pulses substantially simultaneously to said present load counter and said limiting load counter; and wherein said comparator means furnishes said first comparator output signal if the count on said present load counter reaches zero before the count on said limiting load counter and said second comparator output signal if the count on said limiting load counter reaches zero before the count on said load counter.

12. A system as set forth in claim 11, wherein said characteristic curves comprise a plurality of upshift curves each plotting limiting engine load vs. engine speed for upshift from one of said gears to the next higher one of said gears and a plurality of downshift curves plotting limiting engine load vs. engine speed for downshift from one of said gears to the adjacent lower one of said gears;

and wherein said output logic means further means for furnishing a gear shift control signal initiating an upshift from the then-present gear in response to an address control signal signifying an upshift curve and said first comparator output signal and for furnishing a gear shift control signal initiating a downshift from the then-present gear in response to an address control signal signifying a downshift curve and said second comparator output signal.

13. A system as set forth in claim 1, wherein said motor vehicle further has driver operated gear selector means for furnishing desired gear signals (E1); further comprising register means ($R_k$) for storing a plurality of speed limiting values each signifying the maximum speed for downshifting to one of said gears, speed comparing means (D) connected to said register means and said binary speed number furnishing means for comparing a selected one of said speed limiting values corresponding to the then-present gear to said binary speed number and furnishing a blocking signal if said binary speed number exceeds said speed limiting value, and input logic means connected to said speed comparing means and said driver operated gear selector means for blocking said desired gear signal in response to said blocking signal.

14. A system as set forth in claim 13, wherein said vehicle further comprises means for furnishing a kickdown signal (E2);

and wherein said input logic means further comprises means for blocking said kickdown signal in response to said blocking signal.

15. A system as set forth in claim 1, further comprising pressure regulator means (HR) for regulating the pressure in said automatic transmission means in response to a desired pressure signal;

wherein the desired pressure in said automatic transmission means varies as a function of engine load;

and wherein said computing means further comprises pressure computing means for computing a reference main pressure number as a function of said present load number and means connected to said pressure computing means for furnishing said desired pressure signal as a function of said reference pressure number.

16. A system as set forth in claim 15, wherein said means for furnishing a desired pressure signal comprises multiplier means (M) for multiplying said reference pressure number by a fixed frequency signal, and means for furnishing said fixed frequency signal.

* * * * *